(12) United States Patent
Zhou et al.

(10) Patent No.: US 8,816,555 B2
(45) Date of Patent: Aug. 26, 2014

(54) ROTOR FOR A PERMANENT MAGNET ELECTRIC MACHINE

(75) Inventors: Xinyu Zhou, Troy, MI (US); Sinisa Jurkovic, Sterling Heights, MI (US); Qiang Niu, Novi, MI (US); Khwaja M. Rahman, Troy, MI (US); Xu Han, Novi, MI (US); John C. Morgante, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 223 days.

(21) Appl. No.: 13/186,183

(22) Filed: Jul. 19, 2011

(65) Prior Publication Data

US 2013/0020896 A1    Jan. 24, 2013

(51) Int. Cl.
*H02K 1/27* (2006.01)
*H02K 11/02* (2006.01)
*H02K 21/12* (2006.01)
*H02K 29/03* (2006.01)

(52) U.S. Cl.
CPC *H02K 21/12* (2013.01); *H02K 1/27* (2013.01); *H02K 1/276* (2013.01); *H02K 29/03* (2013.01); *H02K 11/02* (2013.01)
USPC ............ 310/156.53; 310/51; 310/156.45; 310/156.56

(58) Field of Classification Search
CPC ......... H02K 1/27; H02K 1/276; H02K 11/02; H02K 21/12; H02K 29/03
USPC ............ 310/156, 51, 156.01, 156.45, 156.53, 310/156.56
IPC ................................... H02K 1/27,11/02, 21/12
See application file for complete search history.

(56) References Cited

U.S. PATENT DOCUMENTS

| | | | |
|---|---|---|---|
| 5,763,976 A | 6/1998 | Huard | |
| 6,727,630 B1 | 4/2004 | Maslov et al. | |
| 6,784,582 B1* | 8/2004 | Kolomeitsev et al. | ... 310/156.38 |
| 7,030,532 B2 | 4/2006 | Kobayashi et al. | |
| 7,417,348 B2* | 8/2008 | Taniguchi et al. | ....... 310/156.53 |
| 7,417,349 B2* | 8/2008 | Tajima et al. | ............ 310/156.53 |
| 7,474,027 B2* | 1/2009 | Kikuchi et al. | .......... 310/156.53 |
| 7,683,518 B2* | 3/2010 | Yoshikawa et al. | .... 310/216.055 |
| 7,915,776 B2* | 3/2011 | Takahata et al. | ......... 310/156.57 |
| 8,344,570 B2* | 1/2013 | Kawamura et al. | ...... 310/156.53 |
| 2005/0200223 A1* | 9/2005 | Tajima et al. | ............ 310/156.46 |
| 2006/0017345 A1* | 1/2006 | Uchida et al. | ............ 310/156.56 |
| 2006/0163967 A1* | 7/2006 | Yamamoto et al. | .......... 310/216 |
| 2006/0208603 A1 | 9/2006 | Kerlin | |
| 2007/0085436 A1* | 4/2007 | Tajima et al. | ............ 310/156.46 |
| 2010/0052455 A1 | 3/2010 | Feng et al. | |

FOREIGN PATENT DOCUMENTS

CN      1901334 A      1/2007

* cited by examiner

*Primary Examiner* — John K Kim

(57) ABSTRACT

A rotor for a permanent magnet electric machine includes an axis of rotation, an outer surface, and a cross-section orthogonal to the axis of rotation with a non-circular contour of the outer surface defined by a plurality of radii angularly distributed around the axis of rotation.

11 Claims, 3 Drawing Sheets

ROTOR FOR A PERMANENT MAGNET ELECTRIC MACHINE

TECHNICAL FIELD

This disclosure is related to permanent magnet electric machines and rotors associated therewith.

BACKGROUND

The statements in this section merely provide background information related to the present disclosure. Accordingly, such statements are not intended to constitute an admission of prior art.

Known electric machines include permanent magnet electric machines. One embodiment of a permanent magnet electric machine includes a multiphase interior permanent magnet (IPM) electric machine having an annular stator into which a rotor is inserted. The stator includes an annular stator core and a plurality of electrical windings. The stator core includes a plurality of radial inwardly projecting teeth that are parallel to a longitudinal axis of the electric machine and define an inner circumference of the stator. Contiguous radial inwardly projecting teeth form radially-oriented slots. The electrical windings are fabricated from strands of suitable conductive material, e.g., copper or aluminum, and are woven or otherwise arranged into coil groups that are inserted into the radially-oriented slots between the teeth. The electrical windings are arranged electrically in series in circular fashion around the circumference of the stator core, with each electrical winding associated with a single phase of the electric machine. Each coil group of the electrical windings provides a single pole of a single phase of machine operation. The quantity of radially-oriented slots in the stator core is determined based upon the quantity of phases and poles of the electrical wiring windings for the electric machine. Thus, a three phase, two-pole machine has electrical windings that are configured as six coil groups, with the coil groups configured in six slots or a quantity of slots that is a multiple of six. Current flow through the electrical windings is used to generate rotating magnetic fields that act on a rotor to induce torque on a shaft of the rotor.

Known rotors for permanent magnet electrical machines include a rotor core attached to a rotating shaft that defines an axis of rotation. Known rotors have a plurality of rotor magnets positioned around the circumference near an outer surface of the rotor core, with each rotor magnet aligned longitudinally with the axis of rotation.

An air gap between teeth of a stator and an outer surface of the rotor is a design feature of an electric machine and is necessary to accommodate manufacturing tolerances, facilitate assembly, and address other known factors. An air gap is preferably minimized, as an increased air gap correlates to reduced magnetic flux and associated reduced output torque.

When electric current flows through stator windings, a magnetic field is induced and acts upon the rotor magnets to induce torque on the rotor shaft. When the magnetic field induces sufficient torque to overcome bearing friction and any induced torque load on the shaft, the rotor rotates the shaft.

In operation, discontinuities in machine torque output including torque ripples are associated with magnitude of the air gap. The air gap and the associated discontinuities in the machine torque output affect maximum machine torque output and affect noise, vibration, and harshness performance of the electric machine.

Known design factors for permanent magnet electric machines include factors related to magnetics, mechanics, thermodynamics, electronics, acoustics, and material sciences. Performance requirements, packaging constraints and costs impose constraints that affect design features. Performance requirements include maximum machine torque output and maximum rotational speed, torque ripple, and cogging torque. The torque ripple and cogging torque affect noise, vibration, and harshness performance of the electric machine. Known permanent magnet electric machines have flux distribution due to the permanent magnets and the armature magneto-motive forces that are non-sinusoidal with respect to the angular rotor position. A non-sinusoidal flux distribution introduces torque pulsations that are reflected as speed ripple, noise and vibration. Torque pulsations may degrade performance of a permanent magnet electric machine and are preferably minimized Torque pulsations affect performance, including efficiency, audible noise, vibration, and harshness. Effects upon performance vary at different operating points, i.e., torque pulsations may vary in response to operating at different speeds and torque outputs. Known strategies to reduce or minimize torque pulsations include skewing locations of magnets in a rotor to minimize torque ripple, adjusting specific design features of a stator and/or a rotor to achieve a minimum torque ripple or achieve a maximum machine torque output at a single operating point, and executing control strategies to generate an inverse torque component through the stator current.

SUMMARY

A rotor for a permanent magnet electric machine includes an axis of rotation, an outer surface, and a cross-section orthogonal to the axis of rotation with a non-circular contour of the outer surface defined by a plurality of radii angularly distributed around the axis of rotation.

BRIEF DESCRIPTION OF THE DRAWINGS

One or more embodiments will now be described, by way of example, with reference to the accompanying drawings, in which.

DETAILED DESCRIPTION

Figure 1:
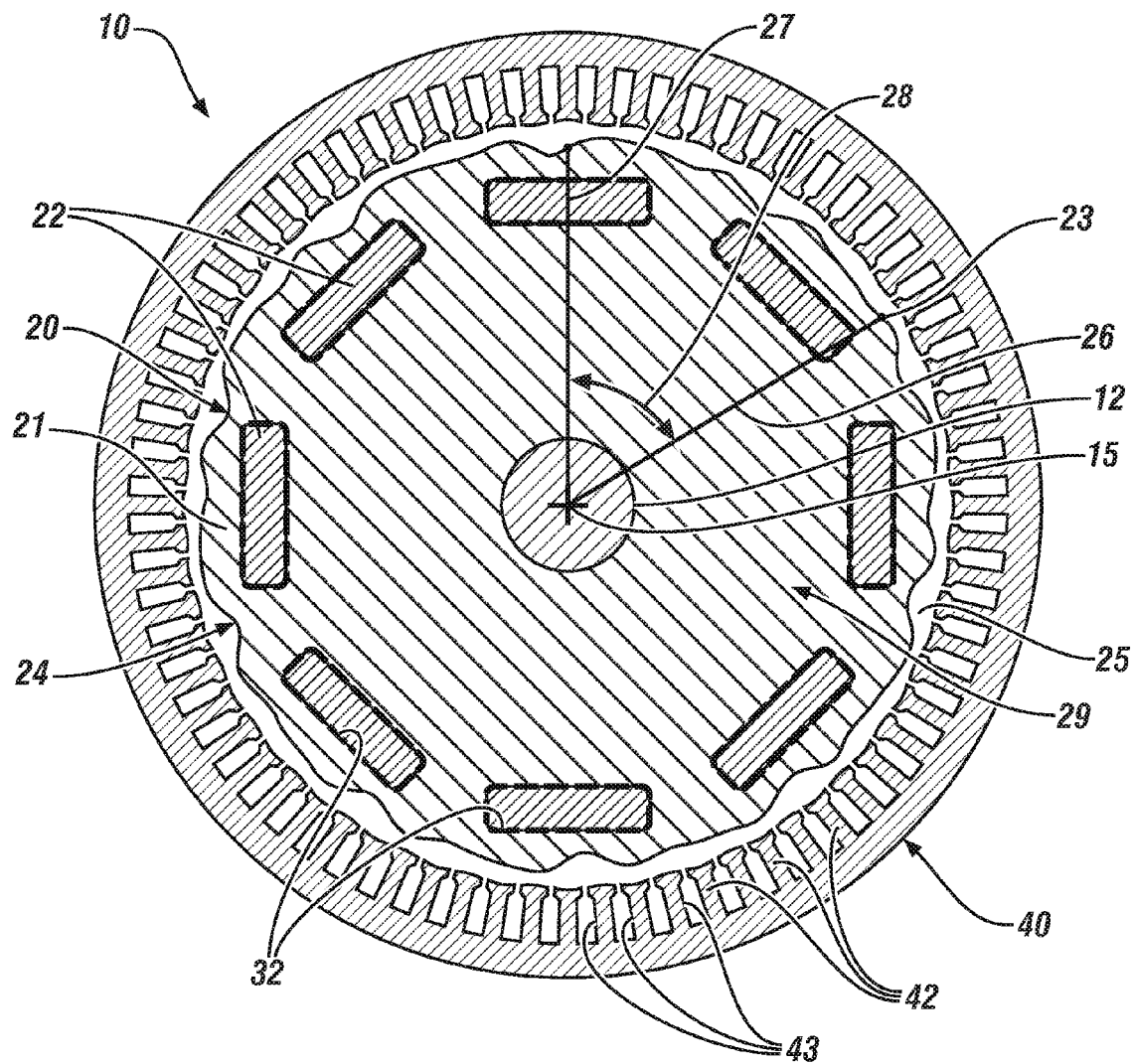
FIG. 1 illustrates a sectional schematic view of an electric machine including a rotor mounted on a shaft and inserted into a hollow cylindrical stator in accordance with the disclosure.

Referring now to the drawings, wherein the showings are for the purpose of illustrating certain exemplary embodiments only and not for the purpose of limiting the same, FIG. 1 schematically shows a cross-sectional view of an embodiment of a permanent magnet electric machine 10 that includes a rotor 20 mounted on a shaft 12 and inserted into a coaxial cylindrical stator 40. The permanent magnet electric machine 10 includes a case having end caps, and the shaft 12 of the rotor 20 is rotatably mounted on bearing surfaces of the end caps. A center line of the shaft 12 defines a longitudinal axis 15 that is an axis of rotation of the rotor 20. The cross-sectional view of the permanent magnet electric machine 10 is shown orthogonal to the axis of rotation of the rotor 20. Rotation of the rotor 20 relative to the stator 40 is defined with reference to the longitudinal axis 15.

In one embodiment, the stator 40 includes a plurality of circumferential radially-oriented, inwardly projecting stator teeth 42 that form radially-oriented inwardly-opening slots 43 between adjacent stator teeth 42. The radially-oriented inwardly-opening slots 43 project parallel to the longitudinal axis 15 of the stator 40. Insulated electrical windings are inserted into the slots 43. In one embodiment, the slots 43 are rectangularly-shaped conduits.

The rotor 20 is a quasi-cylindrically-shaped element including a rotor core 21 having a plurality of longitudinal openings 32 and an outer surface 24. The longitudinal openings 32 are voids formed or otherwise created in the rotor core 21 that are preferably parallel with the axis of rotation 15 and are circumferentially distributed near the outer surface 24. A permanent magnet 22 is inserted into each of the longitudinal openings 32.

The outer surface 24 of the rotor 20 has a non-circular cross-section with a non-circular contour 23 (i.e. an outer periphery) that is non-uniform in a plane orthogonal to the axis of rotation 15 in one embodiment. The contour 23 is defined by a plurality of outer radii $R_i$ 26 corresponding to a plurality of rotor angles $\phi_i$ 28 about the axis of rotation 15. A specific one of the outer radii $R_i$ 26 is radius $R_0$ 27 that corresponds to a nominal rotor angle of 0°, which is depicted at the 12 o'clock position in the figure. The outer surface 24 of the rotor 20 is preferably continuous longitudinally along the axis of rotation 15 and is characterized by the contour 23 that is defined by the plurality of outer radii $R_i$ 26 at the corresponding plurality of rotor angles $\phi_i$ 28. Alternatively, the outer surface 24 of the rotor 20 may discontinuous, with the contour 23 including discrete surfaces that are defined by the plurality of outer radii $R_i$ 26 at the corresponding plurality of rotor angles $\phi_i$ 28.

An air gap 25 is formed between the outer surface 24 of the rotor 20 and the teeth 42 of the stator 40. The air gap 25 is defined as a radial distance between the stator 40 and the outer surface 24 of the rotor 20. It is appreciated that the air gap 25 is non-uniform and varies with the plurality of outer radii $R_i$ 26.

The outer surface 24 of the rotor 20 is configured to achieve an air gap flux density that is substantially sinusoidal in nature. The outer surface 24 of the rotor 20 is designed to inject one or a plurality of harmonic frequencies into the air gap to suppress second-order harmonics, third-order harmonics, and higher-order harmonics that cause electromagnetic noise, torque ripple, and vibration. Outer radii $R_i$ 26 at corresponding rotor angles $\phi_i$ 28 are varied to generate a desired air gap shape that suppresses the second-order harmonics, third-order harmonics, and higher-order harmonics. Different harmonic frequencies may be associated with different operating points of the permanent magnet electric machine 10, and thus a range of operating points of the permanent magnet electric machine 10 are evaluated to determine a preferred design of the outer surface 24 that suppresses harmonics at different operating points.

The outer radii $R_i$ 26 at corresponding rotor angles $\phi_i$ 28 have preferred lengths that achieve a desired air gap shape to inject one or a plurality of harmonic frequencies into the air gap to suppress the higher-order harmonics. The preferred lengths of the outer radii $R_i$ 26 at corresponding rotor angles $\phi_i$ 28 are determined by generating a geometry of the rotor 20 according the following equation:

$$R(\phi) = R_0 + A_1 \cos(\phi - \phi_1) + A_2 \cos(2\phi - \phi_2) + \ldots + A_i \cos(i\phi - \phi_i) \quad [1]$$

wherein:
- $R_0$ is the radius at the rotor angle of 0°;
- $R(\phi)$ is the radius at the rotor angle wherein the rotor angle $\phi$ ranges from 0° to 360° about the axis of rotation;
- $\phi_1$ is the phase angle of the first harmonic;
- $\phi_2$ is the phase angle of the second harmonic;
- $\phi_i$ is the phase angle of the ith harmonic;
- $A_1$ is the amplitude of the first harmonic;
- $A_2$ is the amplitude of the second harmonic; and
- $A_i$ is the amplitude of the ith harmonic.

As is appreciated, such an analysis requires information related to amplitudes and phase angles for first, second, . . . , ith harmonics, preferably for a baseline permanent magnet electric machine analogous to the permanent magnet electric machine 10 that includes the stator 40 and rotor 20 having a single, uniform radius about its circumference.

Figure 2:
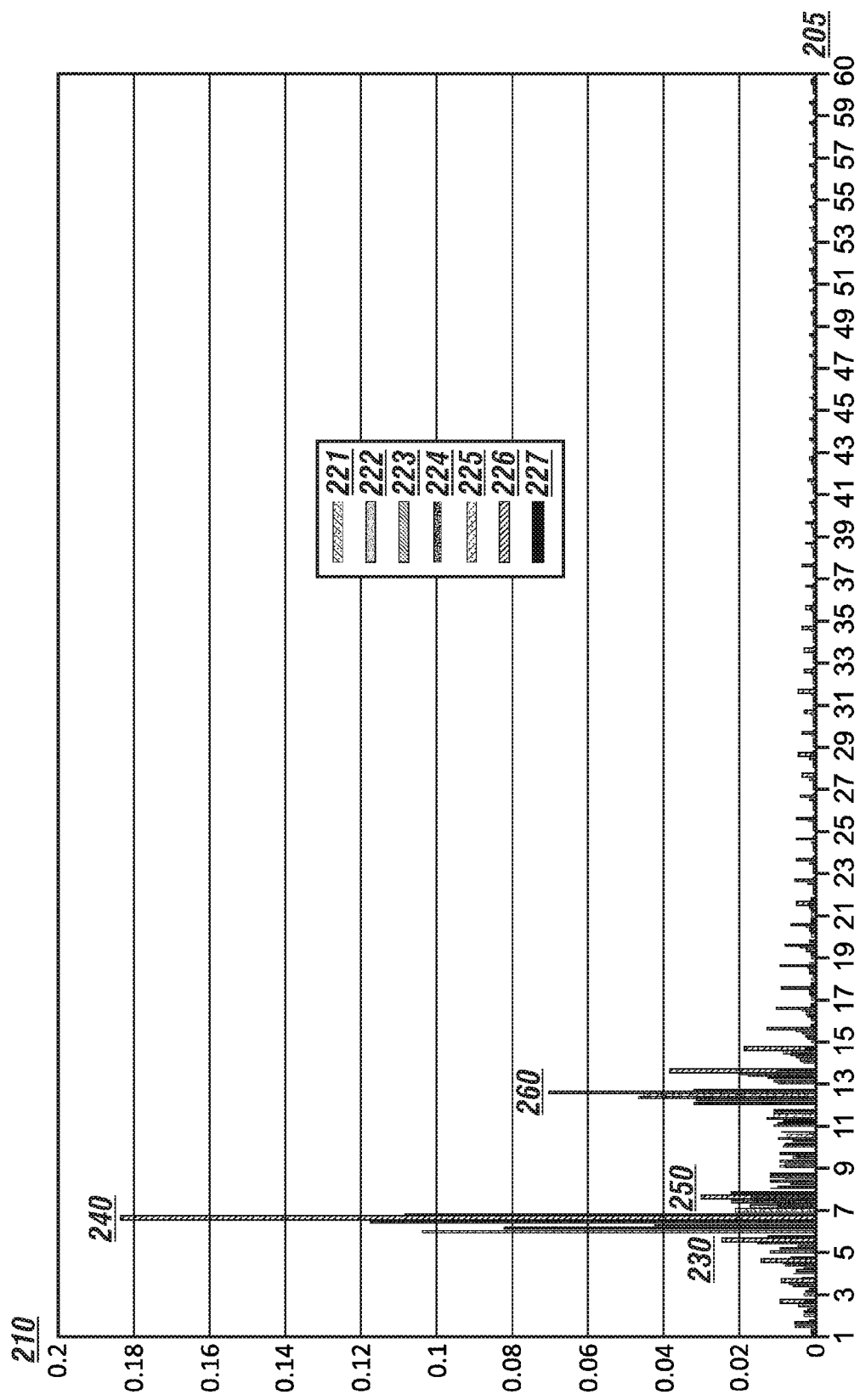
FIG. 2 illustrates a spectrum analysis of data associated with operation of an exemplary baseline permanent magnet electric machine that has a stator and a single-radius rotor in accordance with the disclosure.

FIG. 2 illustrates a spectrum analysis of data associated with operation of an exemplary baseline permanent magnet electric machine including an exemplary stator 20 and a single-radius rotor. The baseline permanent magnet electric machine thus has a uniform air gap. The exemplary baseline permanent magnet electric machine was operated at operating points that include a low speed, low torque operating point, a high speed, high torque operating point, and intermediate operating points. A fast-Fourier transform (FFT) analysis was used to analyze data including torque curves associated with the operation thereof. The depicted spectrum analysis associated with the FFT includes harmonic frequencies on the x-axis (205) and signal intensity on the y-axis (210). The operating points from low speed, low torque to high speed, high torque are depicted as data points 221, 222, 223, 224, 225, 226, 227, and 228. The results of the FFT analysis indicate a plurality of main effective harmonic frequencies associated with the baseline permanent magnet electric machine, including a $24^{th}$ harmonic 230, a $36^{th}$ harmonic 240, a $48^{th}$ harmonic 250, and a $120^{th}$ harmonic 260. The harmonic frequencies may be associated with different operating points of the electric machine 10, and thus a range of operating points of the electric machine 10 are evaluated to determine a preferred design of the outer surface 24 that suppresses harmonics at different operating points.

Figure 3:
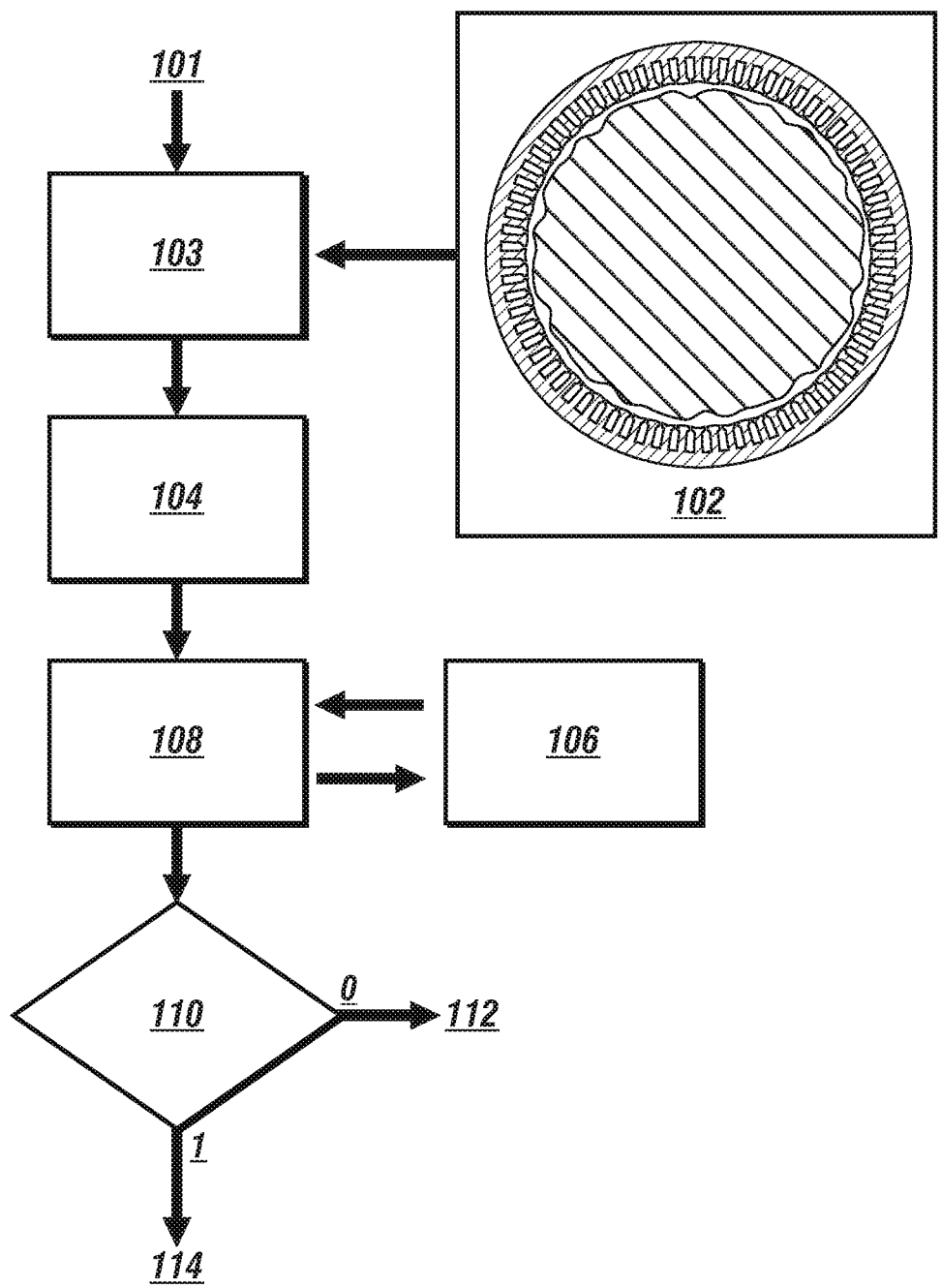
FIG. 3 is a process in flowchart for designing an outer surface for a rotor for a permanent magnet electric machine in accordance with the disclosure.

FIG. 3 is a process flowchart 100 for designing an outer surface for a rotor for a permanent magnet electric machine, described with reference to the permanent magnet electric machine 10 including rotor 20 with outer surface 24 of FIG. 1. The process 100 is preferably iteratively executed to select a preferred outer surface 24 for the rotor 20 that includes preferred radii $R_i$ 26 at corresponding rotor angles $\phi_i$ 28 that are selected or otherwise determined to suppress harmonics at the different operating points.

Table 1 is provided as a key to FIG. 3 *wherein* the numerically labeled blocks and the corresponding functions are set forth as follows.

TABLE 1

| BLOCK | BLOCK CONTENTS |
|---|---|
| 101 | Start |
| 102 | Define input variables |
| 103 | Develop parameterized geometry of baseline machine |
| 104 | Generate Finite Element Analysis of baseline Machine |
| 106 | Define machine operating points Define objectives and constraints |

TABLE 1-continued

| BLOCK | BLOCK CONTENTS |
|---|---|
| 108 | Execute optimization routine |
| 110 | Validate results |
| 112 | Go to Start |
| 114 | End |

The process 100 includes defining input variables (102) and developing a parameterized geometry of the baseline permanent magnet electric machine having a stator and a single-radius rotor and a uniform air gap. A parametric model of the baseline permanent magnet electric machine is generated having the previously determined main effective harmonic frequencies of the baseline permanent magnet electric machine, e.g., those described with reference to FIG. 2 (103).

A finite element analysis model (FEA model) of the baseline permanent magnet electric machine is generated for the selected geometry (104). The generated FEA model takes into consideration parameterized geometry elements using known finite element analysis techniques.

Operating points for the permanent magnet electric machine and operating parameters, objectives and constraints are defined (106). Operating points for the permanent magnet electric machine preferably include rotational speed, stator current and a control angle. The operating points associated with the rotational speed include a plurality of machine speed points selected from a range between a maximum machine speed and a minimum machine speed, which may be at or near zero. The operating points associated with the rotational speed preferably include machine speed points that are in a first rotational direction and a second rotational direction, i.e., in clockwise and counter-clockwise directions.

The operating points associated with the electrical current include a plurality of electrical current points selected from a range between a maximum current and a minimum current, which may be at or near zero. The electrical current may be associated with both a charging current and a discharging current corresponding to operation of the machine as a generator or motor, respectively. Operating constraints preferably include an average torque output from the permanent magnet electric machine 10 at a given operating point defined in terms of the machine speed, the electrical current and the control angle. Operating parameters preferably include a torque ripple, which is determined at the given operating point and the main effective harmonic frequencies of the baseline permanent magnet electric machine. Operating objectives preferably include achieving a minimum torque ripple while achieving an average torque output that is greater than a minimum average torque output.

An optimization routine is executed using the FEA model of the permanent magnet electric machine 10 taking into consideration the parameterized geometry elements (108). Executing the optimization routine preferably includes simulating operation of the FEA model of the permanent magnet electric machine at each of the defined operating points of rotational speed, stator current and control angle taking into consideration the parameterized geometry elements. States for the operating parameters of the average torque output and the torque ripple are determined at each of the defined operating points. This is an iterative process, with the optimization routine executed to evaluate variations in the outer radii $R_i$ 26 at corresponding rotor angles φ, 28 to achieve a preferred outer surface with a preferred outer periphery to generate a desired air gap shape that suppresses the higher-order harmonics, e.g., as shown with reference to FIG. 2, and generate a preferred geometry for the rotor 20 in accord with Eq. 1. The preferred outer surface 24 with the preferred contour 23 achieves a minimum torque ripple and maximizes an average torque output at each of the defined operating points of the permanent magnet electric machine 10.

The results associated with execution of the optimization routine are validated (110) to ensure that none of the constraints were violated and to verify that there is integrity in the preferred outer surface and preferred outer periphery. Validation preferably includes executing the FEA model of the permanent magnet electric machine using the preferred outer surface with the preferred outer periphery at each of the defined operating points of rotational speed, stator current and control angle to verify that the preferred configuration achieves reduced torque ripple across the range of defined operating points. If the validated results indicate convergence (1), the design process terminates (114), with a final product including a solid mathematical model describing a rotor 20 having a preferred outer surface 24 defined in terms of outer radii $R_i$ 26 at corresponding rotor angles $\phi_i$ 28 that achieves minimum torque ripple across the range of defined operating points of the permanent magnet electric machine 10. If the validated results indicate a lack of convergence (0), the design process iterates (112).

The depicted embodiment includes a cylindrically-configured rotor having the features described herein and housed within an annular stator. It is appreciated that the concepts described herein also apply to a cylindrically-configured stator housed within an annular rotor having the features described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A rotor for a permanent magnet electric machine, comprising:
   an axis of rotation;
   an outer surface; and
   a cross-section orthogonal to the axis of rotation with a non-circular contour of the outer surface defined by a plurality of radii angularly distributed around the axis of rotation, wherein the plurality of radii comprise lengths determined in accordance with the following relationship:

$$R(\phi) = R_0 + A_1 \cos(\phi - \phi_1) + A_2 \cos(2\phi - \phi_2) + \ldots + A_i \cos(i\phi - \phi_i)$$

wherein
   $R_0$ is a length of the radius at a rotor angle of 0°,
   $R(\phi)$ is a length of the radius at a rotor angle φ, wherein the rotor angle φ ranges from 0° to 360° about the axis of rotation,
   $\phi_1$ is a phase angle of a first harmonic,
   $\phi_2$ is a phase angle of a second harmonic,
   $\phi_i$ is a phase angle of an ith harmonic,
   $A_1$ is an amplitude of the first harmonic,
   $A_2$ is an amplitude of the second harmonic, and
   $A_i$ is an amplitude of the ith harmonic;
   said lengths of the plurality of radii determined to suppress harmonics at different torque/speed operating points of the permanent magnet electric machine, said harmonics at different torque/speed operating points of the permanent magnet electric machine determined based upon a spectrum analysis of a baseline rotor having a single uniform radius for the permanent magnet electric machine operated at the different torque/speed operating points.

2. The rotor of claim 1, further comprising a plurality of longitudinal openings circumferentially distributed near the outer surface, wherein each longitudinal opening includes a permanent magnet therein.

3. The rotor of claim 1, wherein the outer surface is continuous longitudinally along the axis of rotation.

4. The rotor of claim 1, wherein the contour of the outer surface is configured to inject at least one harmonic frequency in an air gap between the outer surface of the rotor and a stator of the permanent magnet electric machine during rotation of the rotor.

5. The rotor of claim 1, wherein said lengths of the plurality of radii determined to suppress harmonics at different torque/speed operating points of the permanent magnet electric machine comprise lengths of the plurality of radii selected to inject at least one harmonic frequency in an air gap between the outer surface of the rotor and a stator of the permanent magnet electric machine during rotation of the rotor which achieves a minimum torque ripple at the different torque/speed operating points of the permanent magnet electric machine.

6. The rotor of claim 4, wherein said at least one harmonic frequency is configured to minimize torque pulsations at the different torque/speed operating points of the permanent magnet electric machine.

7. The rotor of claim 1, wherein said lengths of the plurality of radii determined to suppress harmonics at different torque/speed operating points of the permanent magnet electric machine comprise the first harmonic, second harmonic and ith harmonic determined based upon the spectrum analysis of the baseline rotor having a single uniform radius for the permanent magnet electric machine operated at the different torque/speed operating points.

8. A permanent magnet electric machine, comprising:
a stator;
a rotor disposed within the stator;
said rotor comprising
  a plurality of permanent magnets,
  an axis of rotation,
  an outer surface, and
  a cross-section orthogonal to the axis of rotation with a non-circular contour of the outer surface defined by a plurality of radii angularly distributed around the axis of rotation;
wherein the plurality of radii comprise lengths determined in accordance with the following relationship:

$$R(\phi)=R_0+A_1\cos(\phi-\phi_1)+A_2\cos(2\phi-\phi_2)+\ldots+A_i\cos(i\phi-\phi_i)$$

wherein
  $R_0$ is a length of the radius at a rotor angle of 0°,
  $R(\phi)$ is a length of the radius at a rotor angle $\phi$, wherein the rotor angle $\phi$ ranges from 0° to 360° about the axis of rotation,
  $\phi_1$ is a phase angle of a first harmonic,
  $\phi_2$ is a phase angle of a second harmonic,
  $\phi_i$ is a phase angle of an ith harmonic,
  $A_1$ is an amplitude of the first harmonic,
  $A_2$ is an amplitude of the second harmonic, and
  $A_i$ is an amplitude of the ith harmonic;
said lengths of the plurality of radii determined to suppress harmonics at different torque/speed operating points of the permanent magnet electric machine, said harmonics at different torque/speed operating points of the permanent magnet electric machine determined based upon a spectrum analysis of a baseline rotor having a single uniform radius for the permanent magnet electric machine operated at the different torque/speed operating points; and
an air gap between the stator and the outer surface which varies with the contour of the outer surface in a manner configured to inject at least one harmonic frequency in the air gap during rotation of the rotor.

9. The permanent magnet electric machine of claim 8, wherein the outer surface is continuous longitudinally along the axis of rotation.

10. The rotor of claim 8, wherein the air gap is configured to suppress higher-order harmonics relative to an air gap that does not vary.

11. A rotor for a permanent magnet electric machine, comprising:
a plurality of permanent magnets;
an axis of rotation;
an outer surface; and
a cross-section orthogonal to the axis of rotation with a non-circular contour of the outer surface defined by a plurality of radii angularly distributed around the axis of rotation;
wherein the plurality of radii comprise lengths determined in accordance with the following relationship:

$$R(\phi)=R_0+A_1\cos(\phi-\phi_1)+A_2\cos(2\phi-\phi_2)+\ldots+A_i\cos(i\phi-\phi_i)$$

wherein
  $R_0$ is a length of the radius at a rotor angle of 0°,
  $R(\phi)$ is a length of the radius at a rotor angle $\phi$, wherein the rotor angle $\phi$ ranges from 0° to 360° about the axis of rotation,
  $\phi_1$ is a phase angle of a first harmonic,
  $\phi_2$ is a phase angle of a second harmonic,
  $\phi_i$ is a phase angle of an ith harmonic,
  $A_1$ is an amplitude of the first harmonic,
  $A_2$ is an amplitude of the second harmonic,
  $A_i$ is an amplitude of the ith harmonic; and
said lengths of the plurality of radii selected to suppress harmonics at different torque/speed operating points of the permanent magnet electric machine, said harmonics at different torque/speed operating points of the permanent magnet electric machine determined based upon a spectrum analysis of a baseline rotor having a single uniform radius for the permanent magnet electric machine operated at the different torque/speed operating points.

* * * * *